(12) United States Patent
Ravindran et al.

(10) Patent No.: US 8,751,638 B2
(45) Date of Patent: Jun. 10, 2014

(54) SYSTEM AND METHOD TO IMPLEMENT JOINT SERVER SELECTION AND PATH SELECTION

(75) Inventors: Ravishankar Ravindran, San Jose, CA (US); Guangyu Shi, Cupertino, CA (US)

(73) Assignee: Futurewei Technologies, Inc., Plano, TX (US)

(\*) Notice: Subject to any disclaimer, the term of this patent is extended or adjusted under 35 U.S.C. 154(b) by 374 days.

(21) Appl. No.: 13/081,064

(22) Filed: Apr. 6, 2011

(65) Prior Publication Data

US 2012/0005371 A1    Jan. 5, 2012

Related U.S. Application Data

(60) Provisional application No. 61/361,244, filed on Jul. 2, 2010.

(51) Int. Cl.
*G06F 15/173*    (2006.01)

(52) U.S. Cl.
USPC ........... 709/224; 709/203; 709/228; 709/229; 709/239; 709/249; 370/352; 370/353; 370/400

(58) Field of Classification Search
USPC ............. 709/242, 203, 228, 229, 239, 249; 370/352, 353, 400
See application file for complete search history.

(56) References Cited

U.S. PATENT DOCUMENTS

| | | | |
|---|---|---|---|
| 7,512,702 B1\* | 3/2009 | Srivastava et al. | 709/238 |
| 2003/0055971 A1 | 3/2003 | Menon | |
| 2003/0099237 A1\* | 5/2003 | Mitra et al. | 370/393 |
| 2003/0172163 A1 | 9/2003 | Fujita et al. | |
| 2006/0233155 A1\* | 10/2006 | Srivastava | 370/351 |
| 2007/0207811 A1\* | 9/2007 | Das et al. | 455/450 |
| 2010/0094950 A1 | 4/2010 | Zuckerman et al. | |
| 2012/0174181 A1\* | 7/2012 | Zhang et al. | 726/1 |
| 2012/0182865 A1\* | 7/2012 | Andersen et al. | 370/228 |
| 2012/0233248 A1\* | 9/2012 | Zou et al. | 709/203 |

FOREIGN PATENT DOCUMENTS

| | | |
|---|---|---|
| CN | 1489069 A | 4/2004 |
| CN | 101287011 A | 10/2008 |
| EP | 2063598 A1 | 5/2009 |
| WO | 0152497 A2 | 7/2001 |

OTHER PUBLICATIONS

Foreign Communication From a Related Counterpart Application, PCT Application PCT/CN2011/076745, International Search Report dated Oct. 20, 2011, 3 pages.

(Continued)

*Primary Examiner* — Faruk Hamza
*Assistant Examiner* — Shah R Zaman
(74) *Attorney, Agent, or Firm* — Conley Rose, P.C.; Grant Rodolph; Brandt D. Howell

(57) ABSTRACT

An apparatus comprising a content router configured to couple to a customer node and implement joint server selection (SS) and path selection (PS) to meet a user request for content and achieve load balancing for transporting the requested content in a provider network. Also disclosed is a network component comprising a receiver unit in a content router or switch configured to receive a user request for content, a content routing engine configured to implement a joint SS and PS algorithm to select a plurality of servers that comprise the content and a plurality of paths that achieve load balancing for transporting the content, and a transmitter unit configured to indicate the selected servers and paths to a provider network.

17 Claims, 13 Drawing Sheets

(56) References Cited

OTHER PUBLICATIONS

Foreign Communication From a Related Counterpart Application, PCT Application PCT/CN2011/076745, Written Opinion dated Oct. 20, 2011, 8 pages.

Foreign Communication From a Counterpart Application, European Application No. 11800197.3, Extended European Search Report dated Jun. 24, 2013, 7 pages.

* cited by examiner

SYSTEM AND METHOD TO IMPLEMENT JOINT SERVER SELECTION AND PATH SELECTION

CROSS-REFERENCE TO RELATED APPLICATIONS

The present application claims the benefit of U.S. Provisional Patent Application No. 61/361,244 filed Jul. 2, 2010 by Ravishankar Ravindran et al. and entitled "Practical Server Selection and Path Selection Algorithms over Several Transport Technologies for Content Distribution," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In a content network, a content router is responsible for routing user requests and content to proper recipients. In the content network, a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network.

SUMMARY

In one embodiment, the disclosure includes an apparatus comprising a content router configured to couple to a customer node and implement joint SS and PS to meet a user request for content and achieve load balancing for transporting the requested content in a provider network.

In another embodiment, the disclosure includes a network component comprising a receiver in a content router or switch configured to receive a user request for content, a content routing engine configured to implement a joint SS and PS algorithm to select a plurality of servers that comprise the content and a plurality of paths that achieve load balancing for transporting the content, and a transmitter configured to indicate the selected servers and paths to a provider network.

In a third aspect, the disclosure includes a network apparatus implemented method comprising receiving a user request for content at a user request handler node, resolving content name, selecting a plurality of servers that comprise the content, and implementing joint server selection and path selection to select at least some of the servers and a plurality of computed paths, wherein at least some of the content is provided and load balanced on the paths.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
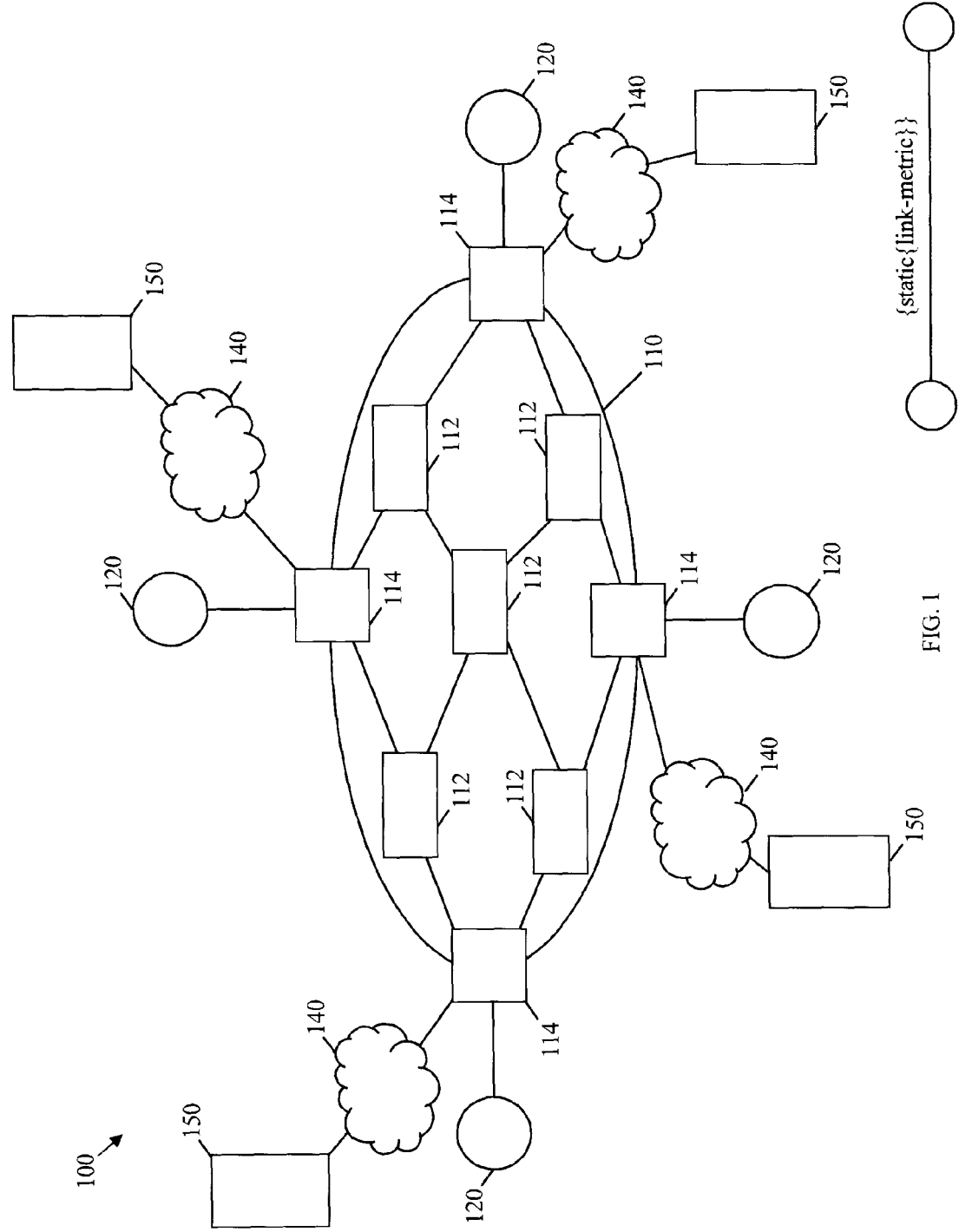
FIG. 1 is a schematic diagram of one embodiment of a content oriented network (CON).

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A network of content routers serves two main functions: 1) process user requests to deliver the requested content to the end user; 2) cache content in real time so that it can be used to serve content for future requests. To address (1), a solution is required to make a decision on the set of content routers from where the content can be retrieved. This decision is based on optimizing the following objectives: 1) to choose the set of content routers so that servers (part of the content routers, or colocated) are load balanced to the maximum extent; 2) as the choice of servers also has an effect on paths that would used to retrieve the content, the other objective is to choose the servers so that the resulting load on the network links is maximally loadbalanced. This multi-objective problem is called the Server Selection (SS) Path Selection (PS) problem. SS-PS is executed locally in a content router, and can coexist with a traffic engineering framework that typically works at long timescales. SS is used to improve the allocation and distribution of content to meet the demands of customers or subscribers. PS is used to balance the load of traffic in the network, transfer traffic efficiently, reduce delays, reduce bottlenecks, improve error recovery, or combinations thereof. The traffic in the network may comprise any network communicated data or services (e.g., Internet traffic and/or other data), including content traffic, such as voice, video, television (TV), and/or other media content. The content may be stored in a plurality of content servers and forwarded via a plurality of content routers in the network. The content servers and content routers may or may not be integrated into the same nodes in the network.

SS and PS may be implemented in different network types, such as Internet Protocol (IP) networks, Multiprotocol Label Switching (MPLS) networks, and Ethernet networks. The networks may or may not support Traffic Engineering (TE), where traffic may be allocated to and forwarded on pre-computed paths in the network. Typically, SS and PS may be implemented globally at the network level, with or without TE support, where some shared or global SS and PS information may be considered. Such global SS and PS implementation may comprise using a dedicated entity or controller in the network to implement a joint SS and TE scheme, for example offline and not on a real-time basis. Alternatively, the joint SS and TE scheme may be distributed among a plurality of content routers, which may jointly process the same request, for example, using a link state database in each router. The joint routers may also communicate with an offline controller to receive recommendations. Both implementations may require configuring a dedicated entity in the network, also may require additions or changes to current network technologies, and/or may be difficult to implement. Further, using an offline controller or a distributed scheme may not be efficient in some network scenarios, such as when responses to user demand are needed on a more dynamic basis.

Disclosed herein are systems and methods for implementing SS and PS in content oriented networks to improve content delivery and meet user demand. The systems and methods may be implemented locally at a content router level in the network. The content router may be configured to locally implement SS and PS based on local information and other shared information in the network. The content routers may implement different joint SS and PS algorithms for different network transport technologies that may or may not use TE. A joint SS and PS algorithm may select a plurality of servers that comprise the content and that are available (e.g., are not busy) to provide the content in a distributed and balanced manner between the servers. The joint SS and PS algorithm may also select a plurality of paths that are available (e.g., have sufficient bandwidth) to transport the content from the servers as a distributed and balanced load across the paths. The content router may receive a request for content from a customer node and implement the joint SS and PS algorithm to select servers and paths to deliver the requested content. A subset of servers may be selected to meet the demand of the customer with the goal of optimizing multiple SS and PS objectives. The content router may signal the network or other nodes in the network about the selected servers and paths.

The joint SS and PS algorithm may be implemented at the content router without the need for a dedicated entity or a separate controller and with or without TE support in the network. The systems and methods disclosed herein may be compatible with current network technologies, such as in IP networks, MPLS networks, and Ethernet networks, where routing may be established using shortest path first (SPF) or open shortest path first (OSPF), pre-planned routes, or by signaling new paths. Also the current IP/MPLS/Ethernet router/switch implementations can be enhanced to implement the SS-PS solutions presented here, and can be also enabled over production networks (i.e., when moving from traditional networking to content oriented framework) through a software upgrade of the control plane.

FIG. 1 illustrates an embodiment of a CON 100, where content may be routed based on name prefixes and delivered to customers based on request. The CON 100 may comprise a network domain 110 that comprises a plurality of nodes, such as an IP domain, a MPLS domain, or an Ethernet domain. The network domain 110 may comprise a plurality of internal nodes 112 and a plurality of content routers 114, which may be coupled to each other via network links, e.g., fixed connections. The content routers 114 may be coupled to a plurality of customer nodes 120 and/or to a plurality of customer sites 150 via a plurality of access networks 140, as shown in FIG. 1.

The internal nodes 112 may be any nodes, devices, or components that support transportation of traffic, e.g., frames and/or packets, through the CON 100. The internal nodes 112 may pass the traffic onto or receive the traffic from other nodes in the same network domain 110. For example, the internal nodes 112 may be routers, switches, or bridges, such as backbone core bridges (BCBs), provider core bridges (PCBs), or label switch routers (LSRs). The internal nodes 112 may also be content routers 114 that forward content based on content name prefixes. The content routers 114 may be any nodes, devices or components that support transportation of traffic between the network domain 110 and external components. The content routers 114 may be edge nodes that forward content traffic from the internal nodes 110 to the customer nodes 120 and/or the customer sites 150, e.g., based on customer request or demand. For example, the content routers may be routers or bridges, such as backbone edge bridges (BEBs), provider edge bridges (PEBs), or label edge routers (LERs) that forward content based on content name prefixes. The internal nodes 112 and/or the content routers 114 may comprise or may be coupled to a plurality of content servers that store or cache content, which may be provided to customers or subscribers, e.g., upon demand.

The customer nodes 120 may be nodes, devices, or components configured to deliver content to a user or customer. For instance, the customer nodes 120 may be fixed or mobile user-oriented devices, such as desktop computers, notebook computers, personal digital assistants (PDAs), or cellular telephones. Alternatively, the customer nodes 120 may be connectivity devices at customer premises, such as modems or set-top boxes. The customer nodes 120 may also comprise customer equipment (not shown) that may be configured to receive content from the content routers 114 and distribute the content to a plurality of customers. For instance, the customer nodes 120 may comprise optical network terminals (ONUs) and/or very high bit rate DSL (VDSL) transceiver units at residential locations (VTU-Rs). The customer sites 150 may be any sites or office environments configured to receive content from the content routers 114, via the access networks 140. The access networks may be any networks that provide access to the content in the CON 100, such as Virtual Private Networks (VPNs).

The traffic, including content, may be transported in the network domain 110 based on IP, MPLS, or Ethernet transport technologies. Specifically, the traffic may be transported without implementing TE, such as on a plurality of fixed links or connections in the network domain 110. Accordingly, the content routers 114 may implement a joint SS and PS scheme, as described below, based on a set of static link metrics between the internal nodes 112 and the content routers 114. The content routers 114 may receive content requests from the associated customer nodes 120 and/or customer sites 150, implement a joint SS and PS algorithm based on the static link metrics, and recommend the content servers and paths to the network and/or the other nodes. Thus, the network or the nodes may transport the requested content in the network domain 110 to the content routers 114 that are associated with the requesting customer nodes 120 and/or customer sites 150. The content routers 114 may then forward the requested content to the customer nodes 120 and/or the customer sites 150.

Figure 2:
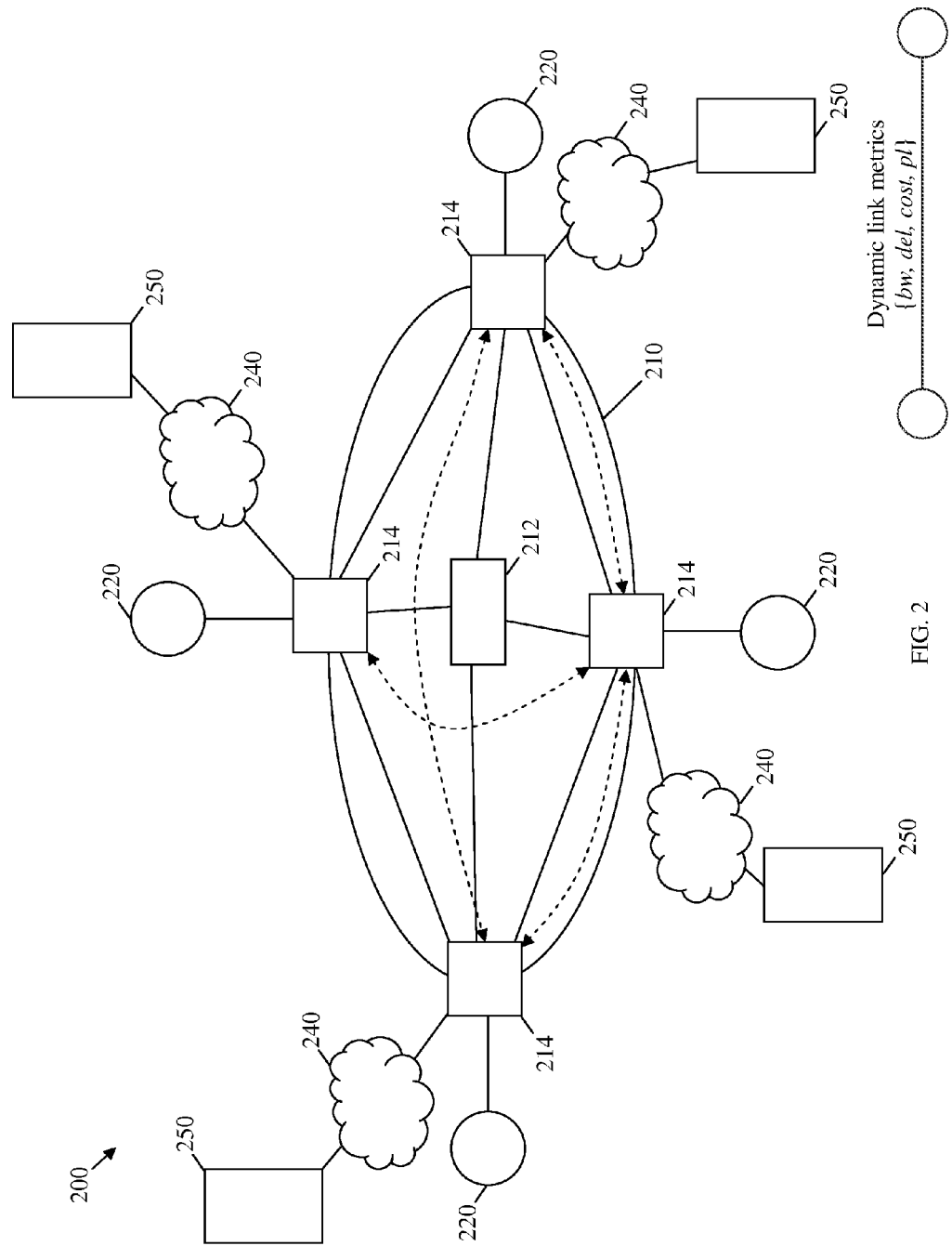
FIG. 2 is a schematic diagram of another embodiment of a CON.

FIG. 2 illustrates an embodiment of another CON 200, where content may be routed based on name prefixes and delivered to customers based on request. The CON 200 may comprise a network domain 210, which may be an IP domain, a MPLS domain, or an Ethernet domain. The network domain 210 may comprise a plurality of internal nodes 212 and a plurality of content routers 214, which may be coupled to a plurality of customer nodes 220 and/or to a plurality of customer sites 250 via a plurality of access networks 240, as shown in FIG. 2. The components of the CON 200 may be configured substantially similar to the corresponding components of the CON 100.

However, the traffic including content may be transported in the network domain 210 using TE, e.g., using a set of computed paths that improve network performance. Accordingly, the content routers 214 may implement a joint SS and PS scheme, as described below, based on a set of dynamic link metrics between the internal nodes 212 and the content routers 214. For example, the dynamic link metrics may include bandwidth (bw), delay (del), cost, packet loss (pl), etc. For instance, the TE paths or links (indicated by the dashed arrow lines) may be dynamically established to forward content more efficiently between content routers 214 instead of forwarding content on fixed links.

In the CON 100 and the CON 200, a service provider may provide content services to a plurality of users. The CON 100 and the CON 200 may be based on the Open Systems Interconnection (OSI) Layer Three (L3) or Layer Two (L2) routing/switching technologies. In the case of IP transport networks, routing may be based on link state routing protocols such as OSPF. In the case of MPLS enabled networks, content may be routed on a plurality of paths that may be pre-computed without signaling new paths. Alternatively, content may be routed on both pre-computed paths and new signaled paths. In the case of Ethernet transport networks, content may be routed on either pre-computed paths or new signaled paths. In the case of a L2 transport networks, routing and signaling may be initiated by the control plane logic or by a centralized mechanism, such as the Open Flow framework.

Figure 3:
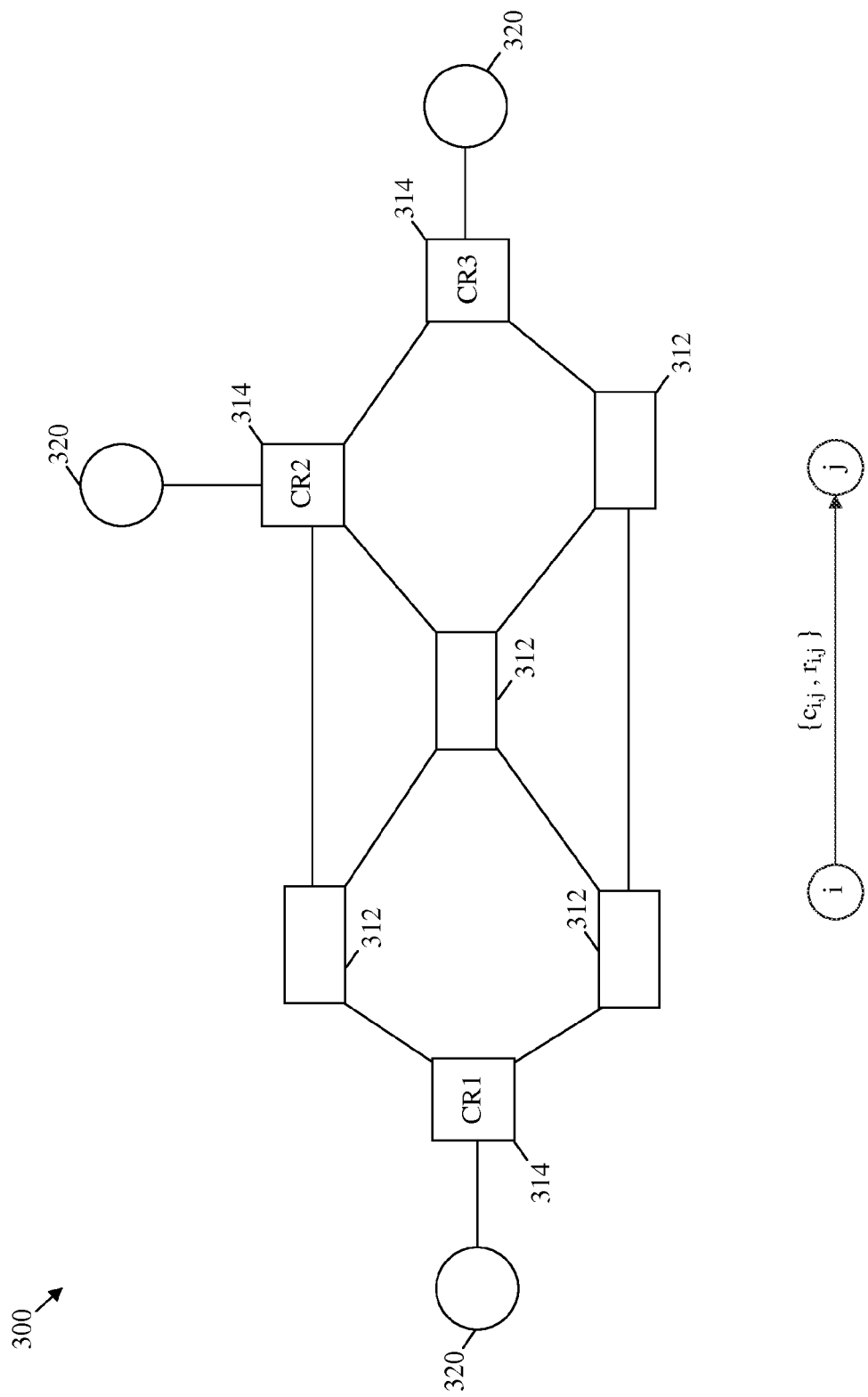
FIG. 3 is a schematic diagram of another embodiment of a CON.

FIG. 3 illustrates an embodiment of another CON 300, where a service provider may provide content services to a plurality of customers. The CON 300 may comprise a plurality of internal nodes 312, a plurality of content routers 314 (labeled CR1, CR2, and CR3), and a plurality of customer nodes 320 associated with the content routers 314. The components of the CON 300 may be configured substantially similar to the corresponding components of the CON 100 or the CON 200 and may be arranged as shown in FIG. 3. Content routing may be implemented during both content publishing (to content servers) and content retrieval (from content servers). Content subscription, e.g., content retrieval/delivery, may be associated with stringent QoS requirement based on user expectations. The SS and PS schemes described herein may be implemented in context of content subscription but may also be similarly used for content publishing.

Content routing may be handled by a content routing engine in a content router 314, which may receive a user request for content, e.g., a publication (PUB) or subscription (SUB) request. The content routing engine may comprise a joint SS and PS optimization controller that may have access to network topology and link state database information. This information may be accessed or obtained using a link state routing protocol or a centralized entity, such as Open Flow.

When the content router 314 receives a content request, the request may be first handled by a name resolution function at the content router 314. The name resolution function may resolve the request into a subset of content routers, e.g., CR1, CR2, and/or CR3, where the requested content may be available. For instance, a received SUB request may be mapped to a demand metric using parameters, such as provider policy, user Service Level Agreement (SLA) requirements, and/or other parameters. The request may then be forwarded to the content routing engine at the content router 314, which may determine how the user demand may be split among multiple content servers and map content transport to paths in the transport plane. The link capacity, $c_{i,j}$, and the link residual capacity, $r_{i,j}$, between each pair of link edge nodes, (i,j), may be considered to compute the paths, as described in detail below. In the case of TE support in the CON 300, a set of TE computed paths may be provided to the content routing engine. If TE is not supported in the CON 300, then the paths may be established using a default routing mechanism, such as SPF.

Figure 4:
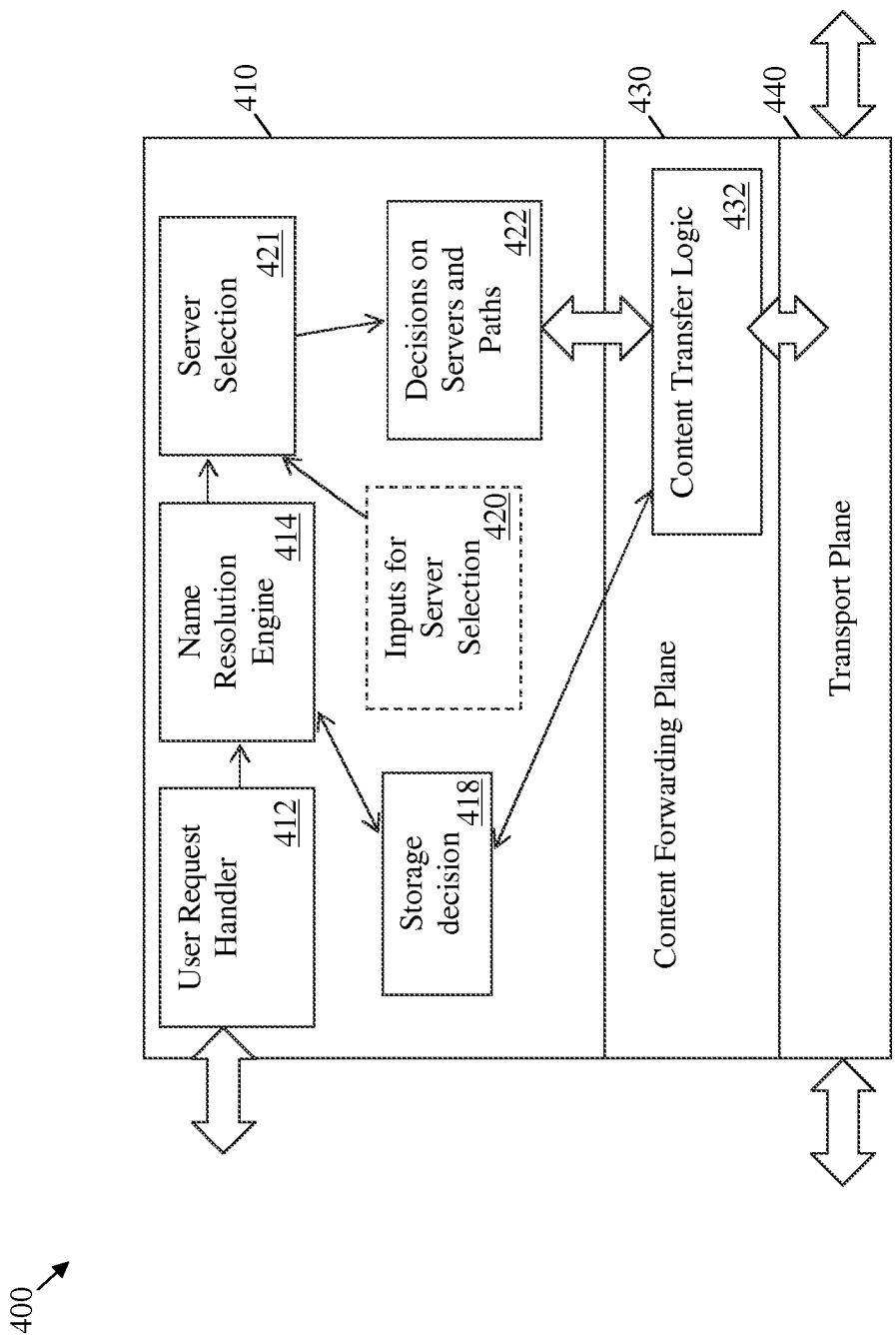
FIG. 4 is a schematic diagram of an embodiment of a content routing architecture.

FIG. 4 illustrates an embodiment of a content routing architecture 400, which may be used in the CON 100, the CON 200, or the CON 300. The content routing architecture 400 may comprise a content routing engine 410, a content forwarding plane 430, and a transport plane 440. The content routing engine 410 may be located at the content router 114, the content router 214, or the content router 314 and may communicate with the content forwarding plane 430, which may in turn communicate with the transport plane 440. The content routing engine 410 may comprise a user request handler block 412, a name resolution engine block 414, an inputs for server selection block 420, a SS block 421, a storage decision block 418, and a decisions on servers and paths block 422. The content forwarding plane 430 may also be located at the content router 114, the content router 214, or the content router 314 and may comprise a content transfer logic block 432 that may communicate with the decisions on servers and paths block 422. The blocks may be logical blocks implemented using software, physical blocks implemented using hardware, or both.

The user request handler block 412 may receive a user request for content, e.g., from a customer node 120 or a customer site 150 and forward the request to the name resolution engine block 414. The name resolution engine block 414 may determine the content based on the name prefix in the received content request and forward a list of available content servers that store the requested content to the SS block 421. The name resolution engine block 414 may receive the set of available servers and/or previously selected servers from the storage decision block 418. The SS block 421 may implement SS based on inputs provided by the inputs for SS block 420. The inputs for SS block 420 may provide a set of link metrics received from the network, e.g., the network plane, and/or a plurality of nodes in the network.

The SS block 420 may forward information about a set of selected content servers to the decisions on servers and paths block 422. The decisions on servers and paths block 422 may implement a joint SS and PS algorithm to decide on a subset of selected content servers and select a plurality of paths for content transport. The decisions on servers and paths block 422 may then forward the information about the selected content servers and paths to the content transfer logic block 432 in the content forwarding plane 430. The content transfer logic block 432 may provide feedback about the selected content servers to the storage decision block 418 and provide the information about the selected content servers and paths to the transport plane 440. The transport plane 440, which may be a network plane, may then forward this information in the network, e.g., to a plurality of nodes in the network. Based on this information, the requested content may be forwarded from the selected content servers via the selected paths.

Figure 5:
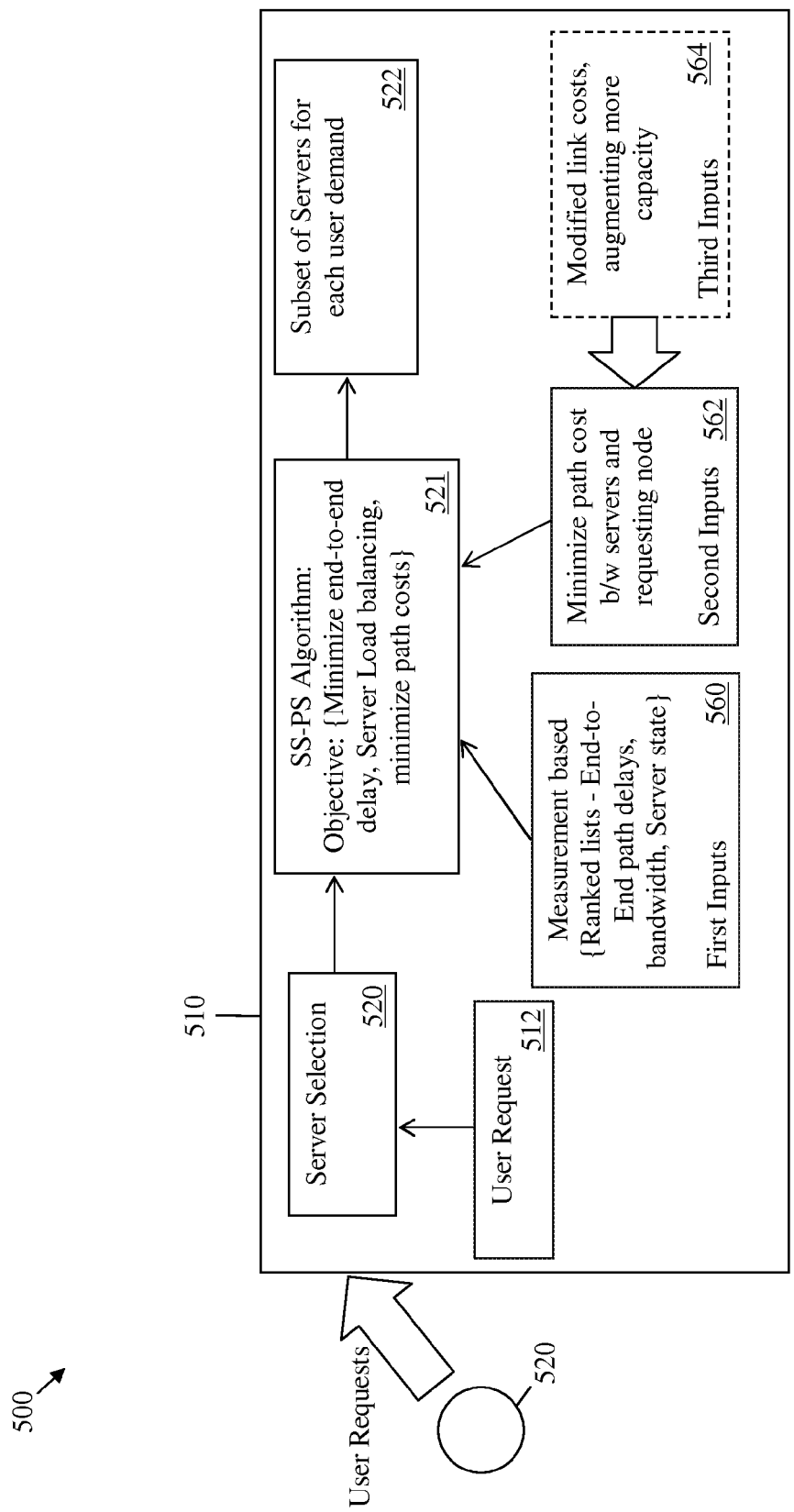
FIG. 5 is a schematic diagram of an embodiment of a joint SS and PS scheme.

FIG. 5 illustrates an embodiment of a joint SS and PS scheme 500, which may be implemented by a content routing engine 510 similar to the content routing engine 410, e.g., at the content router level. Specifically, the joint SS and PS scheme 500 may be used where content is transported in the network without using TE and traffic may be forwarded on a static set of paths. For example, the joint SS and PS scheme may be used in the content routers 114 in the CON 100. The joint SS and PS scheme 500 may comprise a user request block 512, a SS block 520, a joint SS and PS (SS-PS) algorithm block 521, a subset of servers per user demand block 522, a first inputs block 560, a second inputs block 562, and a third inputs block 564. The user request block 512 may receive one or more user requests for content from a customer node 520, which may correspond to the customer node 120 or the customer site 150, and forward each received request to the SS block 520.

The SS block 520 may determine the content, e.g., based on the name prefix in the received content request, and implement SS based on a received set of available servers and/or previously selected servers and a set of link metrics. The SS block 520 may then forward a set of servers that comprise the requested content to the joint SS and PS algorithm block 521. The SS block 520 may be implemented by the inputs for server selection block 420 and the SS block 421. The joint SS and PS algorithm block 521 may implement a joint SS and PS algorithm based on a plurality of inputs to meet a plurality of objectives, such as to minimize end-to-end delays, achieve server load balancing, minimize path costs, and/or other objectives for improving content delivery and network performance. The joint SS and PS algorithm block 521 may then indicate the selected content servers and paths to the subset of servers block 522, which may in turn signal the information per each user demand to the network and/or a plurality of network nodes. The joint SS and PS algorithm block 521 and the subset of servers block 522 may be implemented at the decisions on servers and paths block 422.

The first inputs block 560 and the second inputs block 562 may forward a plurality of inputs to the joint SS and PS algorithm block 521. The first inputs block 560 may forward measurement based inputs, such as ranked lists, end to end path delays, bandwidth, and server state. The second inputs block 562 may forward inputs for minimizing cost between content servers and the requesting node, e.g., the content router 114. The second inputs block 562 may also receive from the third inputs block 564 information about modified link costs and/or augmenting more capacity.

Figure 6:
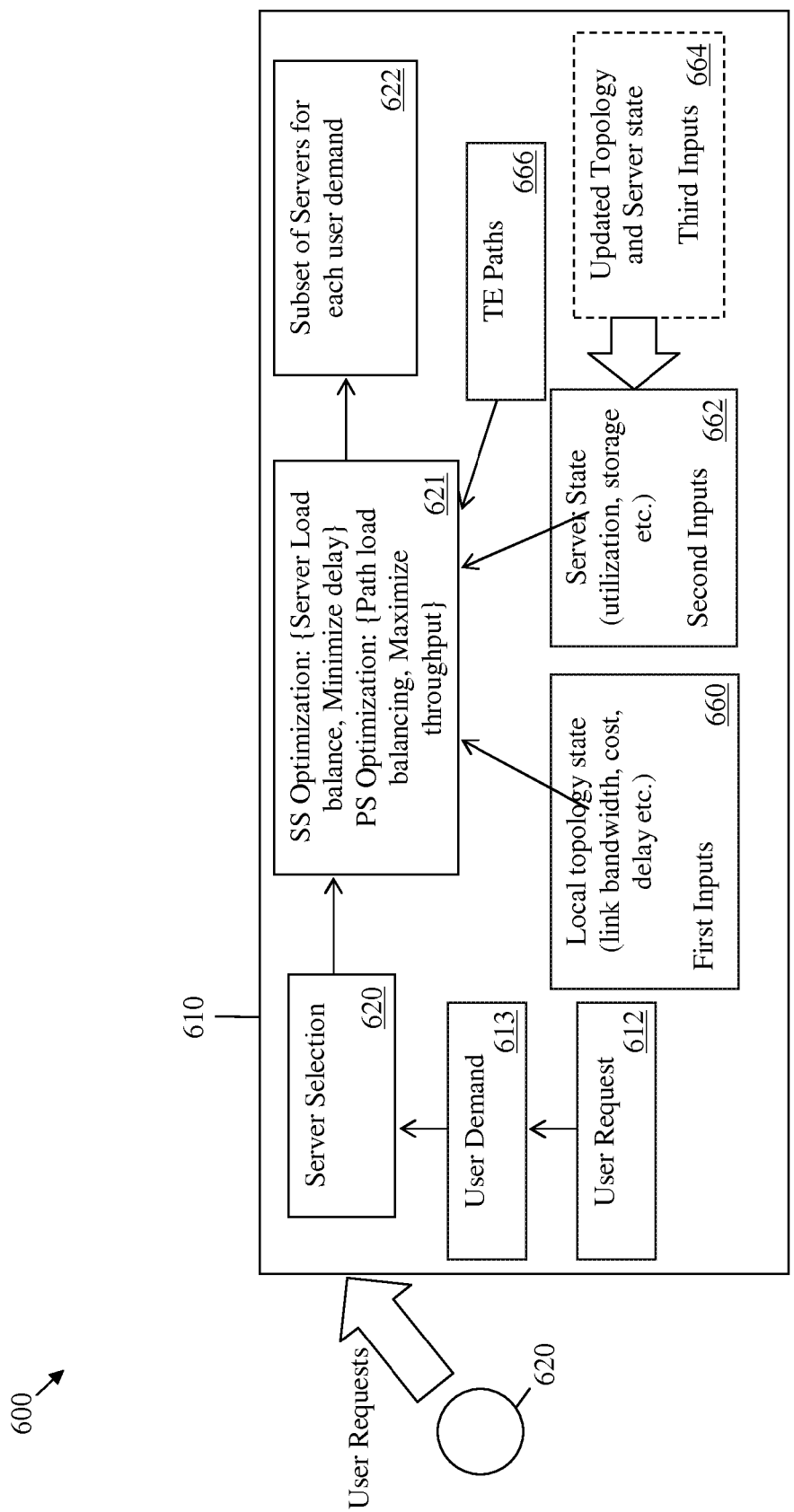
FIG. 6 is a schematic diagram of another embodiment of a joint SS and PS scheme.

FIG. 6 illustrates an embodiment of another joint SS and PS scheme 600, which may be implemented by a content routing engine 610 similar to the content routing engine 410. Specifically, the joint SS and PS scheme 600 may be used where content is transported in the network using TE and traffic may be forwarded on a dynamic set of paths. For example, the joint SS and PS scheme 600 may be used in the content routers 214 in the CON 200. The joint SS and PS scheme 600 may comprise a user request block 612, a user demand block 613, a SS block 620, a joint SS and PS (SS-PS) algorithm block 621, a subset of servers per user demand block 622, a first inputs block 660, a second inputs block 662, a third inputs block 664, and a TE paths block 666. The user request block 612 may receive one or more user requests for content from a customer node 620, which may correspond to the customer node 220 or the customer site 250, and forward each received request to the user demand block 613. The user demand block 613 may process each user request and forward a corresponding user demand request to the SS block 620. The user demand may comprise the user content request and additional requirements for the user, such as quality of service (QoS) and/or wait time demand.

The SS block 620 may determine the content and implement SS based on a list of available and/or previously selected content servers and a set of link metrics. The SS block 620 may then forward a set of selected servers that comprise the requested content to the joint SS and PS algorithm block 621. The SS block 620 may be implemented at the inputs for server selection block 420 and the SS block 421. The joint SS and PS algorithm block 621 may implement a joint SS and PS algorithm based on a plurality of inputs. The inputs may comprise objectives for SS optimization, such as to achieve server load balance and/or minimize delays, and objectives for PS optimization, such as to achieve path load balance and/or maximize throughput. The joint SS and PS algorithm block 621 may then forward information about the selected content servers and paths based on the algorithm to the subset of servers block 622, which may in turn signal the information per each user demand to the network and/or a plurality of network nodes. The joint SS and PS algorithm block 621 and the subset of servers block 622 may be implemented at the decisions on servers block 422.

The first inputs block 660, the second inputs block 662, and the TE paths 666 may forward a plurality of inputs to the joint SS and PS algorithm block 621. The first inputs block 660 may forward local topology state information, such as link bandwidth, cost, delay, etc. The second inputs block 662 may forward server state, such as utilization, storage, and/or other server state information. The first inputs block 660 and the second inputs block 662 may also receive from the third inputs block 664 information about updated topology and server state. The TE paths block 666 may provide to the joint SS and PS algorithm block 621 TE information, which may comprise a list of computed TE paths.

A joint SS and PS scheme, such as the joint SS and PS scheme 500 or the joint SS and PS scheme 600, may be implemented to fulfill a user request and implement content subscription or retrieval/delivery. This may be achieved by formulating a joint SS and PS problem using graph theory literature and a plurality of notations, as defined in Table 1 below, and solving the problem using a joint SS and PS algorithm. The joint SS and PS problem may be formulated by defining a user request or demand, D, at a source node, t, which may be met by a subset of content routers $R \subset X$, where R is a set of selected content routers and X is a larger set of available content routers in a content providers network G(V, E). The problem comprises determining the amount of demand that needs to be met by each content router in the set R and the network paths needed to transport the content from the serving nodes (e.g., content servers) to the requesting node (e.g., the content router associated with customer) while balancing load as much as possible.

TABLE 1

Graph theory notations for content routing problem.

| Notations | Definition |
|---|---|
| G(V, E) | Graph with vertex set V and Edge set E mapping to a content providers network |
| X | Subset of content routers, $X \subseteq V$ |
| $c_{i,j}$ | Capacity of edge $(i, j) \in E$ |
| $r_{i,j}$ | Residual capacity of $(i, j) \in E$ |

TABLE 1-continued

Graph theory notations for content routing problem.

| Notations | Definition |
|---|---|
| D | user demand that needs to be met |
| R | Subset of routers chosen to satisfy a user demand D |
| t | Content router serving a given user |

The joint SS and PS problem may be solved by dividing the demand proportionally among multiple servers and paths as a function of the path residual capacity. This joint SS and PS solution scheme may lead to distributing load across multiple paths and achieving the objective of load balancing. Additionally, the solution may avoid further congestion of paths that have reached the maximum load limit or have approached their maximum allowable load thresholds.

Figure 7:
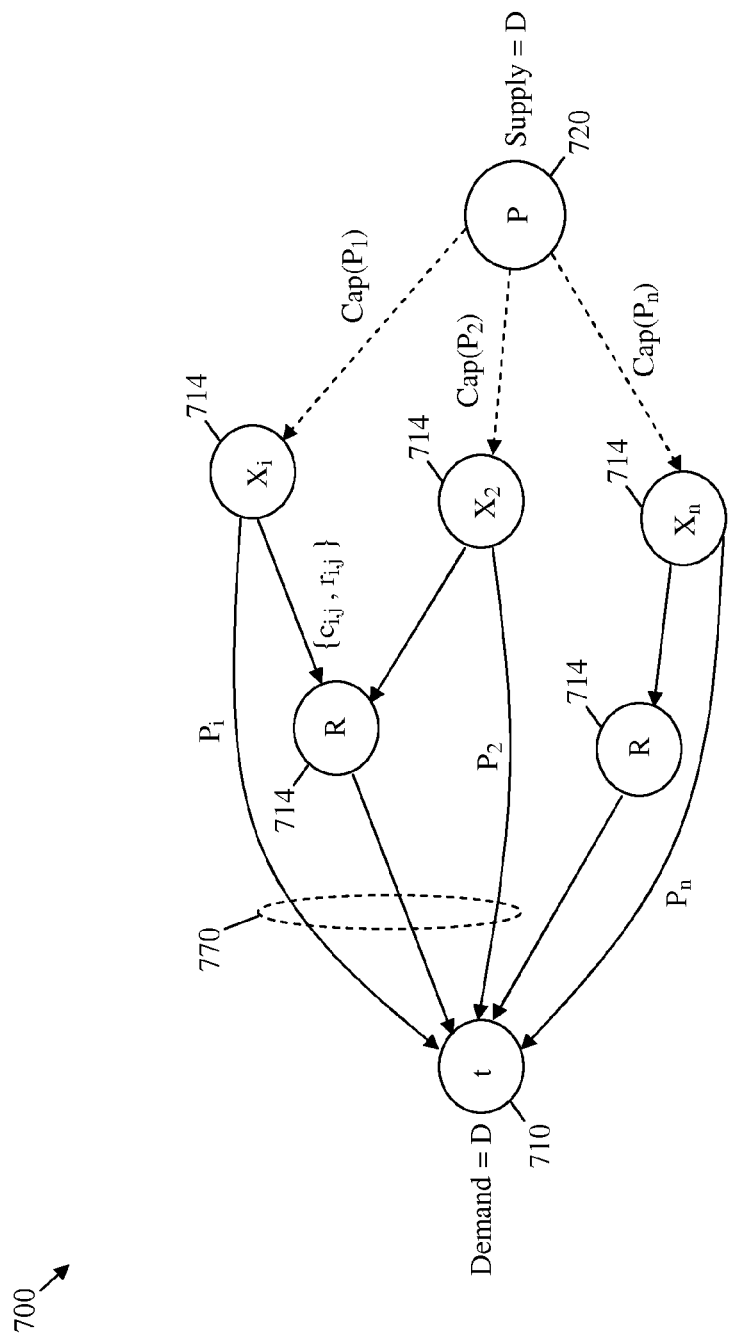
FIG. 7 is a schematic diagram of an embodiment of a joint SS and PS algorithm.

FIG. 7 illustrates an embodiment of a joint SS and PS algorithm 700 that may be implemented to solve the joint SS and PS problem. The joint SS and PS algorithm 700 may be implemented in an IP based CON, where routing may be based on SPF computation. The CON may comprise a source node 710 (labeled t) that requests user demand (D), a plurality of routers 714 (labeled R and X) that routes the requested content, and a pseudo node 720 (labeled P) that supplies D. The source node 710 may correspond to a content router serving a customer node or a customer site, the routers 714 may comprise content routers, and the pseudo node 720 may comprise one or more content servers that store and maintain content.

The SS and PS algorithm 700 may comprise splitting the demand D along a plurality of SPF paths from the nodes R. The paths may be selected to meet the demand D of the source node t 710. The joint SS and PS algorithm 700 may be solved at the source node 710, which may receive a SUB request for example. The source node 710 may determine the shortest path from the set of nodes R 714 to the source node t 710. For example, the Dijkstras algorithm or a similar algorithm may be used to compute the shortest paths. The shortest paths may be selected such that the cumulative demand D may be met and some of the shortest paths from the nodes R 714 to the source node t 710 may share the same links 770. The objective of the joint SS and PS algorithm 700 is to ensure providing the demand D using the shortest paths and achieving load balancing over the paths. The joint SS and PS problem may be formulated as a single commodity supply-demand flow problem between two nodes, e.g., the source node 710 and the pseudo node 720. The capacity of the link connecting the pseudo node P to the set of nodes R may be substantially large.

The joint SS and PS algorithm 700 may comprise dividing the demand D along the SPF paths proportionally based on the maximum feasible path capacity. To divide the demand among multiple servers, the maximum feasible path capacity may be computed such that an edge node may be shared among multiple SPF paths from the set of nodes R 714 to the source node t 710. For example, the edge nodes for the shared paths may comprise the node t and a node $X_i$, $X_2$, or $X_n$.

The pseudo code for the joint SS and PS algorithm 700 may comprise the following steps:
1. Checking for the demand feasibility condition. If this condition is not satisfied, then the demand D may be relaxed to the maximum flow from the node P 720 to the source node t 710 or by relaxing the maximum transfer time of the content to the user.

2. Computing the maximum feasible flow $Cap(P_i)$ for each $(x_i,t)$ pair by:
  a. deriving a sub-graph with nodes and links corresponding to the union of nodes and links in the SPF path for the node pair $(x_i,t)$.
  b. using this sub-graph, iterating for all $(x_i,t)$ pairs (e.g., $(x_1,t), (x_2,t) \ldots (x_n,t)$, where n is an integer).
  c. pushing maximum flow from each destination node $X_i$ 740 to the source node t 720. This flow may correspond to the bottleneck bandwidth, which is $Cap(P_i)$ for the source-destination pair $(x_i,t)$.
  d. subtracting this maximum feasible flow from the links residual capacity.
  e. returning to step b.
3. [sic—no 3 in original; continues]
4. When $Cap(x_i)$ is determined, the demand may be divided proportionately among the SPF paths from the destination nodes on one edge to the source nodes on the other edge. The flow corresponding to the demand split from node Xi to node t may be represented as $f(P_i)$, as follows:

$$f(P_i)=D\times Cap(P_i)/\Sigma Cap(P_i) \quad (1)$$

5. The steps may end after implementing step 4.

The joint SS and PS algorithm 700 above may first test the feasibility of meeting the demand D by computing the maximum flow from node P to node t. If the maximum flow is less than the demand, the request may not be feasible. In this case, the user demand may be relaxed by considering the allowable maximum delay threshold of meeting the user demand. If the demand is feasible, the maximum feasible flow $Cap(x_i)$ from the nodes $X_i \in R$ to the node t. The maximum feasible flow may be computed based on the SPF from the nodes R to the node t, which may share some of the links, e.g., the links 770. Upon computing $Cap(P_i)$, the demand may be split among the nodes R and the corresponding SPF paths from the subset of nodes r∈R to the node t proportionally as a function of the paths' maximum feasible capacity. The complexity of this algorithm may be estimated as $O(N^2 \times M)+O(N^2)=O(N^2 \times M)$, where N is the quantity of routers 714 and M is the quantity of content servers.

Figure 8:
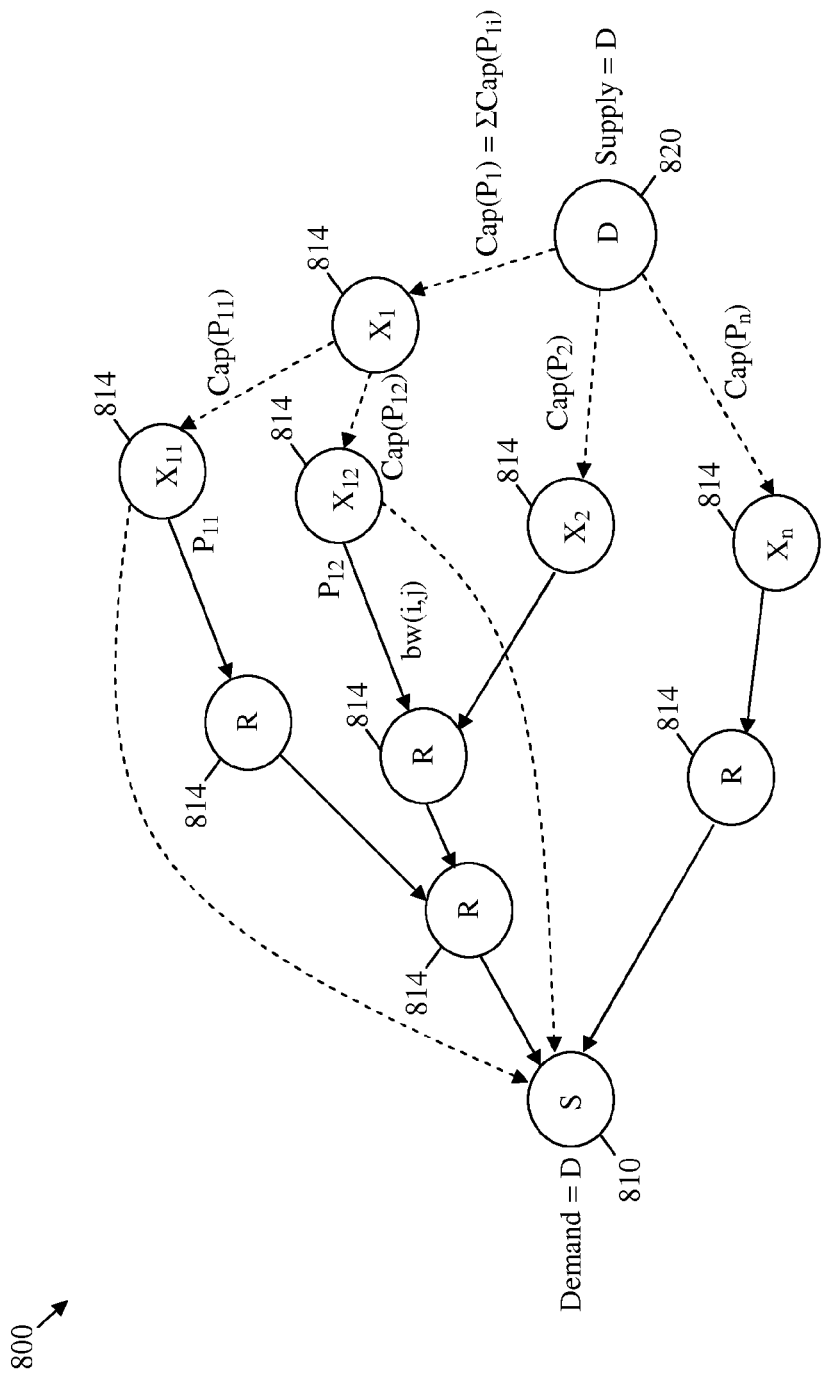
FIG. 8 is a schematic diagram of another embodiment of a joint SS and PS algorithm.

FIG. 8 illustrates an embodiment of another joint SS and PS algorithm 800 that may be implemented to solve the joint SS and PS problem. The joint SS and PS algorithm 800 may be implemented in an IP based CON that supports equal cost multi-path (ECMP) routing. The CON may comprise a source node 810 (labeled s), a plurality of routers 814 (labeled R and X), and a pseudo node 820 (labeled D), which may be configured substantially similar to the corresponding components above. The joint SS and PS algorithm 800 may extend the joint SS and PS algorithm 700 when multiple SPF paths may be established from a node $X_i$ to node s. In this case, $Cap(P_i)$ may be computed as the aggregate of capacity of each ECMP path from nodes $(x_{i,j})$ to node s. These paths may be denoted as $P(i,j)$. The link capacity of a node $X_i$ to a node $X_{i,j}$, $Cap(P_{i,j})$, which may also be the maximum feasible capacity over path $P_{i,j}$, may be computed. $Cap(P_{i,j})$ may be computed similar to $Cap(P_i)$ in the joint SS and PS algorithm 700. Thus, $Cap(P_i)$ may correspond to a set to aggregate $Cap(P_{i,j})$ values. Similarly, $Cap(P_i)$ may be computed for other nodes. As such, the demand D may be split among the multiple content routers/nodes (e.g., the routers 814) using equation (1) above, which may be represented as $f(P_i)$. Further, $f(P_i)$ may be split among the paths $P_{i,j}$ using a modified form of equation 1, as follows:

$$f(P_{i,j})=f(P_i)\times Cap(P_{i,j})/\Sigma Cap(P_{i,j}) \quad (2)$$

In the case of MPLS based networks, multiple routing scenarios may be used. For instance, routing may be based on SPF. In this case, the joint SS and PS algorithm 700 or the joint SS and PS algorithm 800 may be used. In another case, the MPLS based network may support TE, which may be provided by the service provider. In this case, an algorithm may be used to balance the load on the links based on future demands as input, which may comprise content and the background traffic demands. The output of the TE policy may comprise a set of paths that may be used for future SUB (or PUB) requests at each border node, e.g., a router node associated with a customer. Two types of TE policies may be considered. In a first TE policy, label switched paths (LSPs) may be pre-configured between a pair of ingress node and egress node that receive/send external traffic outside the network. In a second TE policy, a set of LSPs may be pre-configured, but the provider may also allow dynamic setup and tear down of new LSPs.

Figure 9:
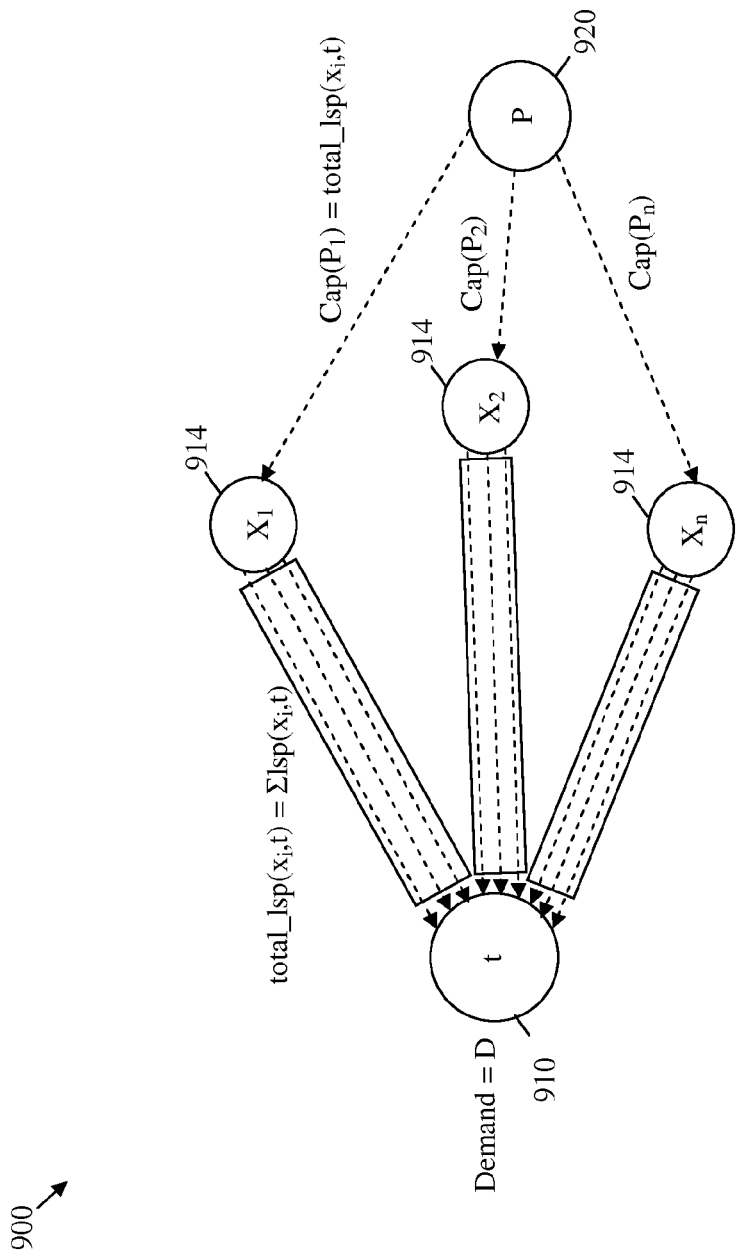
FIG. 9 is a schematic diagram of another embodiment of a joint SS and PS algorithm.

FIG. 9 illustrates an embodiment of a joint SS and PS algorithm 900 that may be implemented in a MPLS based CON, where TE policies dictate using only pre-configured paths, e.g., in the case of the first TE policy above. The CON may comprise a source node 910 (labeled t), a plurality of routers 914 (labeled X), and a pseudo node 920 (labeled P), which may be configured substantially similar to the corresponding components above. The information about TE policy requirements may be indicated in the request serving node, e.g., the source node 910, for example in a TE policy database. Typically, the pre-configured TE LSPs may be provisioned with predetermined bandwidth. The available capacity may be used, e.g., over time, for routing background traffic between the content router nodes, e.g., the routers 914. The last updated or current residual capacity for the LSPs may be derived from a label switched database (LSDB) and the set of links traversed by each of the LSPs. The total residual capacity, total_lspi(xi,t) for a pair of nodes $(x_i,t)$ may be equal to the sum of the residual capacities of a plurality of links between the pair of nodes$(x_i,t)$, such as total_lsp$(x_i,t)$=$\Sigma$lspi $(x_i,t)$. The link capacity of the pair of nodes, Cap$(x_i,t)$, may be set equal to total_lsp$(x_i,t)$.

The pseudo code for the joint SS and PS algorithm 900 may comprise the following steps:

1. Checking for the feasibility of meeting the demand. If the demand may not be met, then the demand may be relaxed.
2. Determining the total capacity total_lsp$(x_i,t)$ as the sum of all the capacities of all the LSPs between the pair of nodes $X_i$ and t, e.g. total_lsp$(x_i,t)$=$\Sigma$lsp$(x_i,t)$.
3. Initializing a feasible capacity Cap$(x_i,t)$=total_lsp$(x_i,t)$.
4. Determining the demand at each destination node $X_i$ by splitting the flow proportionately, such as f$(x_i,t)$=D×Cap$(x_i,t)$/$\Sigma$Cap$(x_i,t)$.
5. Splitting the demand at each node $X_i$ along the set of LSPs from $X_i$ to t to determine the final flow on each LSP f(lsp$_k$($x_i$, t), as follows: f(lsp$_k$($x_i$,t)=f$(x_i,t)$×Cap((lsp$_k$($x_i$,t))/$\Sigma$Cap((lsp$_k$ ($x_i$,t)).
6. The steps may end after implementing step 5.

Figure 10:
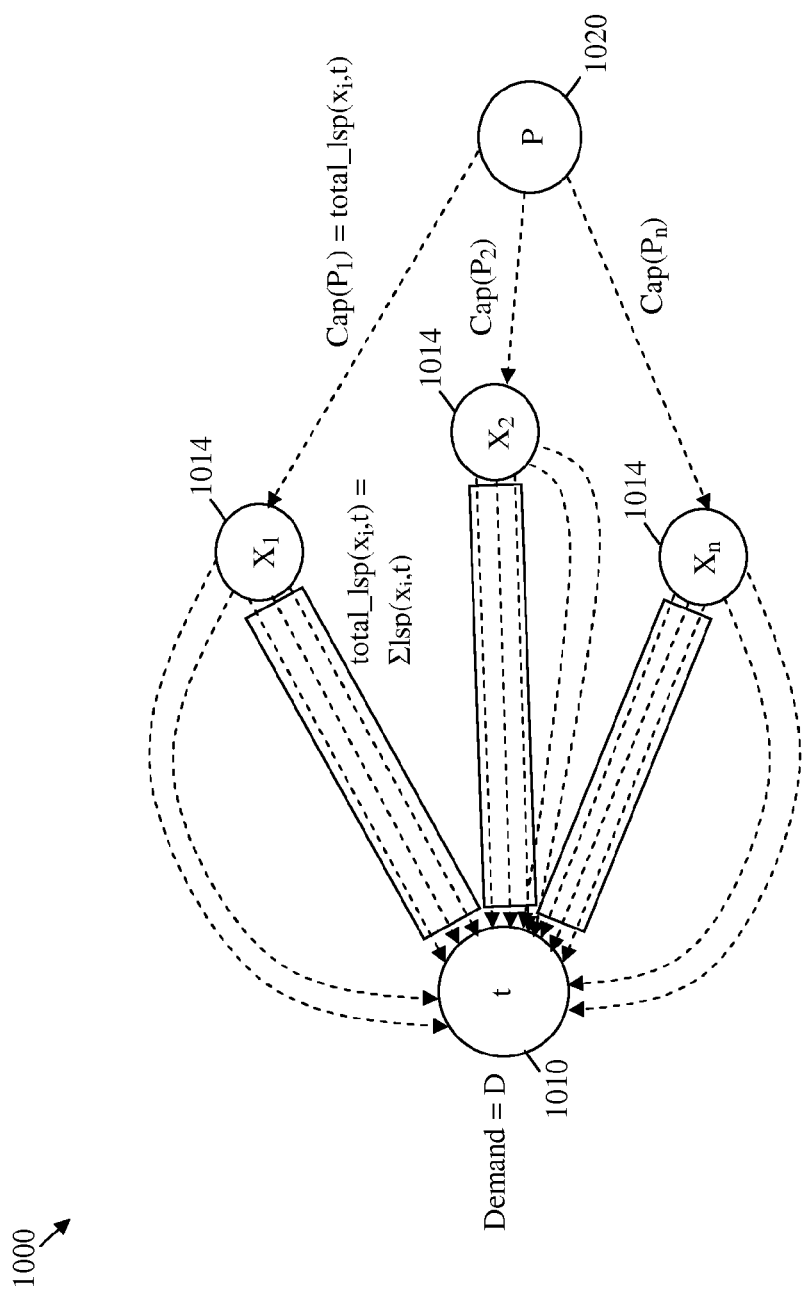
FIG. 10 is a schematic diagram of another embodiment of a joint SS and PS algorithm.

FIG. 10 illustrates an embodiment of a joint SS and PS algorithm 900 that may be implemented in a MPLS based CON, where TE policies enable pre-configured paths and on-demand signaling for new paths, e.g., in the case of the second TE policy above. The CON may comprise a source node 1010 (labeled t), a plurality of routers 1014 (labeled X), and a pseudo node 1020 (labeled P), which may be configured substantially similar to the corresponding components above. The information about the TE policy may be obtained from a TE policy controller. In this case, new paths may be provisioned on-demand to meet any lacking demand that may not be met by the pre-configured paths. In one embodiment, the new paths may be computed and signaled on-demand by a TE policy controller in the network. In another embodiment, the new paths may be computed by the content router that receives and handles the user request. In this case, well known or standard TE algorithms may be extended to determine the new paths at the content router. Since on-demand signaling may introduce delays in the path provisioning process, the joint SS and PS algorithm 900 may be implemented using the pre-configured paths to meet the user demand as much as possible and new paths may only be computed if necessary.

The pseudo code for the joint SS and PS algorithm 900 may comprise the following steps:

1. Testing the feasibility of meeting the demand over the total capacity of the pre-configured and on-demand LSPs for all the $(x_i,t)$ node pairs.
2. Testing the feasibility of meeting the demand using the pre-configured LSPs.
   a. If the demand may be met using the pre-configured paths, then the joint SS and PS algorithm 900 that is based on pre-configured paths may be used to determine the LSP flows.
3. If the demand is not met by the pre-configured LSPs, then the following steps may be applied:
   a. Determining the amount or portion of demand that may be met using pre-configured paths.
   b. Using the joint SS and PS algorithm 900 on the aggregate on-demand set of LSPs to obtain the aggregate demand for the on-demand LSPs from a destination node (e.g., $X_i$) to the source node t 1010.
   c. Saturating or maximizing load on each of the on-demand LSPs, that may be sorted in the order of their capacity, to minimize signaling instead of proportionately dividing the flows over the LSPs. This may be achieved by:
      Iterating step c for each $(x_i,t)$ pair for each $X_i$ node over the set of on-demand LSPs.
      Identifying the LSPs that may be signaled for each $(x_i,t)$ pair.
      Some of the LSPs may have been feasible when the TE policy was derived, but may not be feasible anymore at the current network state. Such LSPs may be avoided in the iteration as the path selection may apply on the latest state of the network topology.
4. Signaling the list of identified on-demand LSPs.
5. The steps may end after implementing step 4.

In the case of MPLS based networks, multiple routing scenarios may be used. For instance, routing may be based on SPF. In this case, the joint SS and PS algorithm 700 or the joint SS and PS algorithm 800 may be used. In another case, the MPLS based network may support TE, which may be provided by the service provider. In this case, an algorithm may be used to balance the load on the links based on future demands as input, which may comprise content and the background traffic demands. The output of the TE policy may comprise a set of paths that may be used for future SUB (or PUB) requests at each border node, e.g., a router node associated with a customer. Two types of TE policies may be considered. In a first TE policy, label switched paths (LSPs) may be pre-configured between a pair of ingress node and egress node that receive/send external traffic outside the network. In a second TE policy, a set of LSPs may be pre-configured, but the provider may also allow dynamic setup and tear down of new LSPs.

In the case of Ethernet transport networks, spanning tree protocol (STP) may be used to establish links between nodes in a loop-free topology. Ethernet transport is also being developed for carrier networks. The Ethernet's routing and signaling plane has been developed to transport data on an Ethernet transport infrastructure and thus provide carrier grade routing reliability and management capability. Since this control (routing and signaling) plane logic is not fully standardized, a centralized mechanism, such as Open Flow framework, may be used to enable an intelligent control plane. With Open Flow, a centralized control function may have the knowledge of the network topology and link state. The centralized control function also may have the capability of providing the output of the routing computation as switching policies to the Ethernet switching nodes.

The joint SS and PS problem in Ethernet transport networks may be addressed in multiple scenarios that comprise combinations of the IP and MPLS cases above. In one scenario, the routing may be based on a shortest path first scheme and the algorithms for the IP cases discussed above, the joint SS and PS algorithm 700 or the joint SS and PS algorithm 800, may be implemented. In another scenario, TE SS may be enabled, where the Open Flow intelligence may be enhanced to perform TE and SS. In this scenario, two cases may apply that are similar to the MPLS cases discussed above for the first and second TE policies. In a first case, the paths may be pre-configured and on-demand signaling may not be allowed. In a second case, on-demand signaling may be allowed and used with pre-configured paths. The two algorithms for the two MPLS cases (the two TE policies), the joint SS and PS algorithm 900 and the joint SS and PS algorithm 1000, may be used for the corresponding two similar Ethernet transport cases. However, when a centralized control plane (e.g., Open Flow) is used for Ethernet transport, the routing policies may be applied at the L2 layer switches to establish the pre-computed paths for transporting demand or requested content between the set of nodes in R (e.g., selected content routers) to t 1010.

Figure 11:
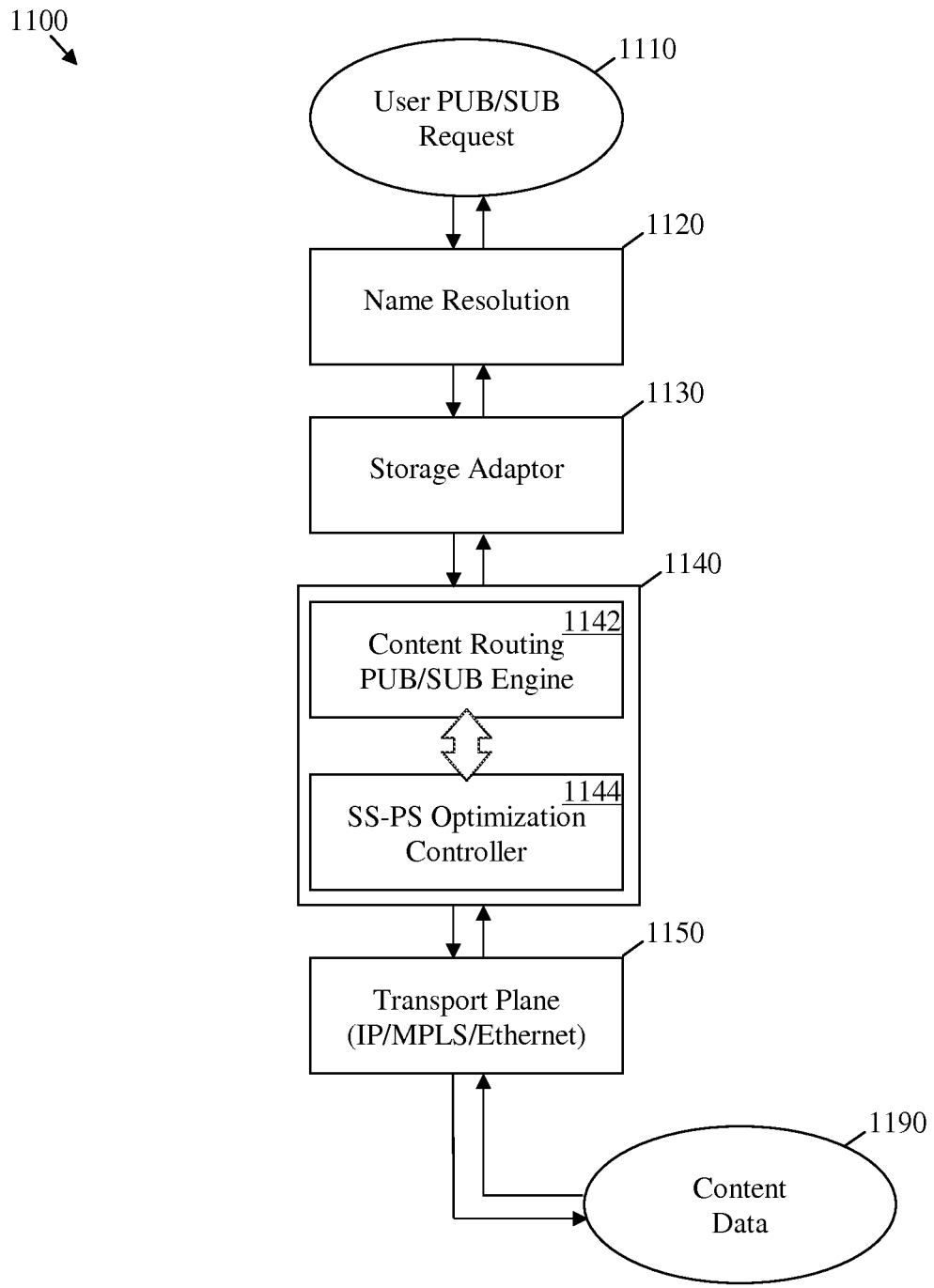
FIG. 11 is a flowchart of an embodiment of a joint SS and PS method.

FIG. 11 illustrates an embodiment of a joint SS and PS method 1100, which may be used to solve the joint SS and PS problem in a CON. The CON may be an IP network, an MPLS network, or an Ethernet network. The joint SS and PS method 1100 may be implemented at a content router that receives a user request, e.g., a SUB or PUB request, and using hardware, software, or both. The joint SS and PS method 1100 may be implemented by a content router, such as the content router 114, the content router 214, or the content router 314. The method 1100 may begin at block 1110, where a user PUB and/or SUB request may be received at the content router. For example, the PUB/SUB request may be processed at the user request handler block 412. The request may be received by the content router 114 or 214 from the customer node 120 or 220 or the customer site 150 or 250, respectively.

At block 1120, the request may be processed by a name resolution function. The name resolution function may determine the requested content based on the name prefix in the received content request. For example, the name resolution function may be implemented at the name resolution engine block 414. At block 1130, the request may be processed by a storage adaptor. The storage adaptor function may resolve the request into a subset of content routers that comprise the requested content. The storage adaptor function may provide a set of available servers and/or previously selected servers that are associated with the user demand. For example, the storage adaptor function may be implemented at the storage decision block 418.

At block 1140, the request may be processed by a content routing engine. For example, the content routing engine function may be implemented at the content routing engine 410. At block 1142 in the block 1140, the request may be processed by a content routing PUB/SUB engine. The content routing PUB/SUB engine may implement SS based on a received set of available servers and/or previously selected servers and a set of link metrics. The content routing PUB/SUB engine may be implemented at the server selection block 420. At block 1144 in the block 1140, the request may be processed by a joint SS and PS (SS-PS) optimization controller. The joint SS and PS optimization controller may implement a joint SS and PS algorithm, such as one of the algorithms described above based on the network transport technology. The joint SS and PS optimization controller function may be implemented at the decisions on servers and paths block 422.

At block 1150, the request may be processed by a transport plane, which may be based on IP, MPLS, or Ethernet technology. The transport plane function may forward information about the selected content servers and paths in the network, e.g., to a plurality of nodes in the network. For example, the transport plane function may be implemented at the transport plane 440. At block 1190, content data may be forwarded from the selected content servers via the selected paths. The forwarded content data may meet the user demand and request and may be forwarded proportionately, e.g., about evenly, on the selected paths to achieve load balancing. The content data may be forwarded back to the transport plane and may be processed in the reverse order at the blocks above and subsequently delivered to the user. The method 1100 may then end.

Figure 12:
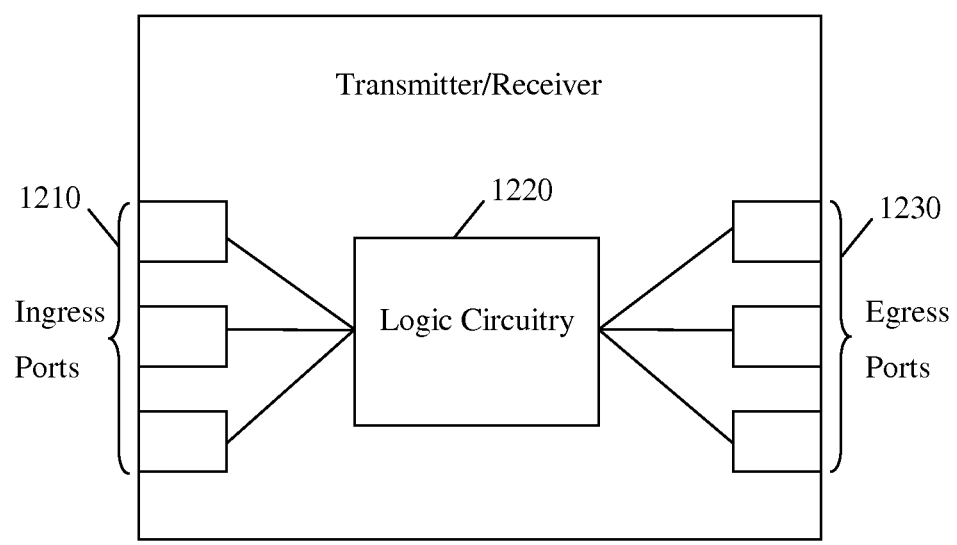
FIG. 12 is a schematic diagram of an embodiment of a transmitter/receiver unit.

FIG. 12 illustrates an embodiment of a transmitter/receiver unit 1200, which may be any device that transports packets through a network. For instance, the transmitter/receiver unit 1200 may be located in the content router 114 or any node in the CON 100, the content router 214 or any node in the CON 200, or the content router 314 or any node in the CON 300. The content router may also be configured implement the joint SS and PS method 1100 described above. The transmitted/receiver unit 1200 may comprise one or more ingress ports or units 1210 for receiving packets, objects, or type-length-values (TLVs) from other network components, logic circuitry 1220 to determine which network components to send the packets to, and one or more egress ports or units 1230 for transmitting frames to the other network components. The logic circuitry 1220 may also be configured to implement at least some of the steps of the joint SS and PS method 1100, which may be based on hardware, software, or both.

Figure 13:
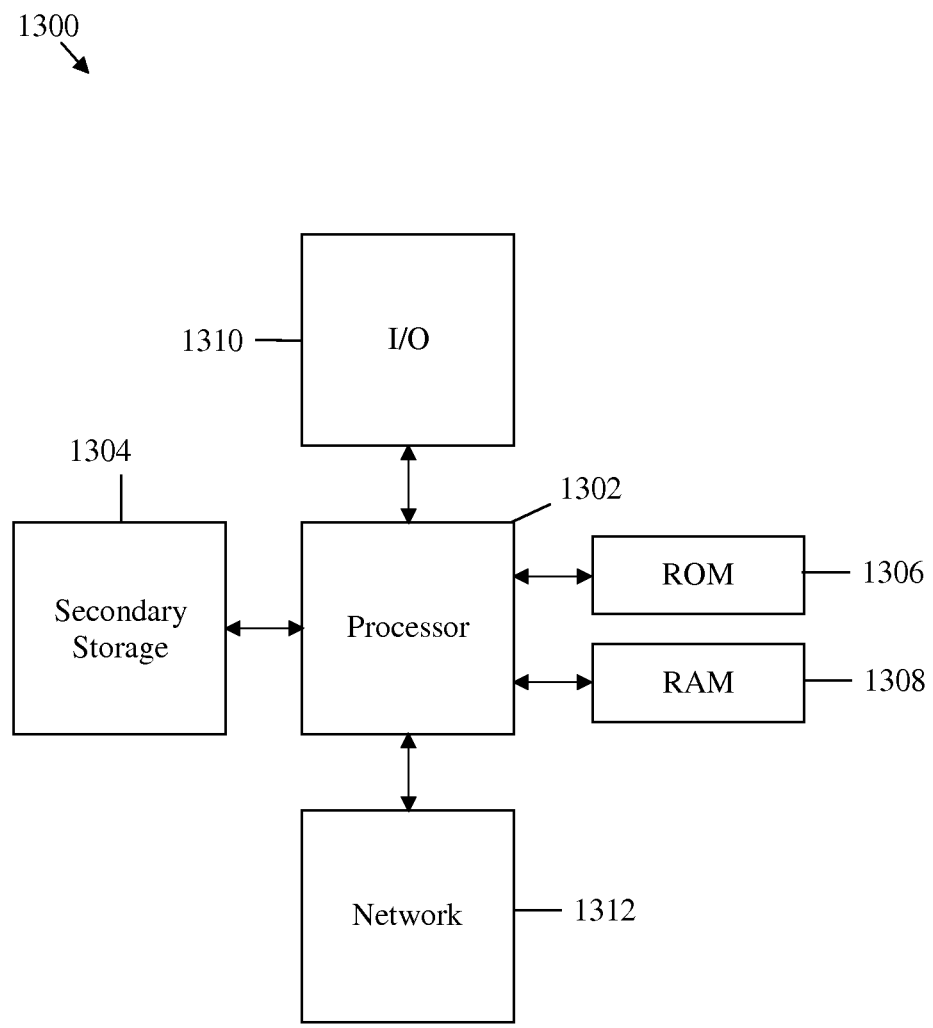
FIG. 13 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 13 illustrates a typical, general-purpose network component 1300 suitable for implementing one or more embodiments of the components disclosed herein. The network component 1300 includes a processor 1302 (which may be referred to as a central processor unit or CPU) that is in communication with memory devices including second storage 1304, read only memory (ROM) 1306, random access memory (RAM) 1308, input/output (I/O) devices 1310, and network connectivity devices 1312. The processor 1302 may be implemented as one or more CPU chips, or may be part of one or more application specific integrated circuits (ASICs).

The second storage 1304 is typically comprised of one or more disk drives or tape drives and is used for non-volatile storage of data and as an over-flow data storage device if RAM 1308 is not large enough to hold all working data. Second storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of second storage 1304. The RAM 1308 is used to store volatile data and perhaps to store instructions. Access to both ROM 1306 and RAM 1308 is typically faster than to second storage 1304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a content router configured to couple to a customer node and implement joint server selection (SS) and path selection (PS) to meet a user request for content and achieve multiple joint optimization objectives for transporting the requested content in a provider network,
   wherein implementing joint SS and PS comprises:
      selecting a plurality of content servers comprising the user-requested content;
      identifying a plurality of available content servers from the plurality of content servers, wherein availability is determined based on a predefined processing limit;
      identifying a plurality of paths to transport data from the available content servers;
      checking that a demand feasibility condition is satisfied, wherein the availability is relaxed if the demand feasibility condition is not satisfied;
      calculating an initial feasible flow capacity from the one or more available content servers to the content router;
      dividing the initial feasible flow capacity among the plurality of paths; and
      selecting at least one server and at least one path for obtaining the user-requested content.

2. The apparatus of claim 1, wherein the content router is an edge node that is coupled to a plurality of nodes in the provider network that comprise other content routers, content servers, or both.

3. The apparatus of claim 1, wherein the provider network is one of an Internet Protocol (IP) network that supports shortest path first (SPF) routing, an Internet Protocol (IP) network that supports equal cost multi-path (ECMP) routing, and a Multiprotocol Label Switching (MPLS) network that supports a Traffic Engineering (TE) policy that allows routing on pre-computed paths only.

4. The apparatus of claim 1, wherein achieving multiple joint optimization objectives comprises:
   selecting a set of content routers such that a plurality of content servers are substantially load balanced; and
   selecting the plurality of content servers such that a resulting load on a plurality of network links in the provider network is substantially load balanced.

5. The apparatus of claim 1, wherein achieving multiple joint optimization objectives comprises at least one of the following objectives: substantially minimizing end-to-end delays, substantially achieving server load balancing, and substantially minimizing path costs.

6. The apparatus of claim 1, wherein the provider network is a Multiprotocol Label Switching (MPLS) network that supports a Traffic Engineering (TE) policy that allows routing both pre-computed paths and signaling new routing paths.

7. The apparatus of claim 1, wherein the provider network is an Ethernet transport network that supports shortest path first (SPF) routing.

8. The apparatus of claim 1, wherein the provider network is an Ethernet transport network that supports Open Flow framework routing that supports a Traffic Engineering (TE) policy that allows routing on pre-computed paths only.

9. The apparatus of claim 1, wherein the provider network is an Ethernet transport network that supports Open Flow framework routing that supports a Traffic Engineering (TE) policy that allows routing both pre-computed paths and signaling new routing paths.

10. A network component comprising:
a receiver in a content router or switch configured to receive a user request for content;
a content routing engine coupled to the receiver and configured to implement a joint server selection (SS) and path selection (PS) algorithm, wherein implementing joint SS and PS algorithm comprises:
checking that a demand feasibility condition is satisfied, wherein the availability is relaxed if the demand feasibility condition is not satisfied;
calculating an initial feasible flow capacity from one or more available content servers to the content router;
selecting at least one of a plurality of content servers that each comprise the content;
dividing the initial feasible flow capacity among a plurality of paths; and
selecting at least one of the plurality of paths from the selected server that achieve load balancing for transporting the content; and
a transmitter coupled to the content routing engine and configured to indicate the selected content servers and paths to a provider network.

11. The network component of claim 10, wherein the content servers and paths are selected based on network topology and link state information obtained using a link state routing protocol.

12. The network component of claim 10, wherein the content servers and paths are selected based on network topology and link state information obtained using a centralized control entity in the provider network.

13. The network component of claim 10, wherein the content is transported on a static set of paths, and wherein the joint SS and PS algorithm is based on a plurality of inputs comprising measurement-based inputs, inputs for minimizing cost between the content servers and the content router, inputs comprising information about modified link costs, inputs augmenting more capacity, or combinations thereof.

14. The network component of claim 10, wherein the content is transported on a dynamic set of paths, and wherein the joint SS and PS algorithm is based on a plurality of inputs that comprise local topology state information, server state, information about updated topology and server state, Traffic Engineering (TE) information, or combinations thereof.

15. The network component of claim 10, wherein the content servers are selected to achieve substantial load balancing between the content servers and meet user demand for content.

16. A network apparatus implemented method comprising:
receiving a user request for content at a user request handler node;
resolving a content name;
selecting a plurality of content servers that comprise the content; and
implementing joint server selection (SS) and path selection (PS),
wherein at least some of the content is provided and load balanced on the paths, and
wherein implementing joint SS and PS comprises:
selecting a plurality of content servers comprising the user-requested content;
identifying a plurality of available content servers from the plurality of content servers, wherein availability is determined based on a predefined processing limit, and wherein the plurality of available content servers comprises a second node;
identifying a plurality of paths to transport data from the available content servers;
checking a demand feasibility condition, wherein user demand is relaxed if the demand feasibility condition is not satisfied;
calculating an initial feasible flow capacity to the content router from one or more available content servers;
dividing the initial feasible flow capacity among the plurality of paths; and
selecting at least one server and at least one path for obtaining the user-requested content.

17. The method of claim 16, wherein the content servers and paths are selected based on a set static link metrics when the paths are selected without using Traffic Engineering (TE) or based on a set of dynamic link metrics when TE paths are selected.

* * * * *